(12) United States Patent
Yang

(10) Patent No.: US 8,797,665 B2
(45) Date of Patent: Aug. 5, 2014

(54) SYSTEMS AND METHODS FOR CHANNEL QUALITY DETERMINATION

(75) Inventor: Shaohua Yang, Santa Clara, CA (US)

(73) Assignee: LSI Corporation, San Jose, CA (US)

( * ) Notice: Subject to any disclaimer, the term of this patent is extended or adjusted under 35 U.S.C. 154(b) by 192 days.

(21) Appl. No.: 13/342,240

(22) Filed: Jan. 3, 2012

(65) Prior Publication Data
US 2013/0170063 A1  Jul. 4, 2013

(51) Int. Cl.
*G11B 5/09* (2006.01)
*G11B 27/36* (2006.01)
*G11B 5/035* (2006.01)

(52) U.S. Cl.
USPC ................. 360/39; 360/31; 360/65

(58) Field of Classification Search
None
See application file for complete search history.

(56) References Cited

U.S. PATENT DOCUMENTS

| | | |
|---|---|---|
| 7,113,356 B1 | 9/2006 | Wu |
| 2006/0256670 A1 | 11/2006 | Park |
| 2011/0164669 A1* | 7/2011 | Mathew et al. ............... 375/227 |
| 2012/0158810 A1* | 6/2012 | Liao et al. ..................... 708/322 |
| 2013/0016846 A1* | 1/2013 | Tan et al. .................... 381/71.11 |
| 2013/0111294 A1* | 5/2013 | Tan et al. ..................... 714/755 |
| 2013/0148233 A1* | 6/2013 | Xia et al. ....................... 360/65 |

OTHER PUBLICATIONS

U.S. Appl. No. 13/316,953, Unpublished (filed Dec. 12, 2011) (Haitao Xia).
U.S. Appl. No. 13/340,974, Unpublished (filed Dec. 30, 2011) (Dan Liu).
U.S. Appl. No. 13/251,342, Unpublished (filed Oct. 3, 2011) (Haitao Xia).

* cited by examiner

*Primary Examiner* — Regina N Holder
(74) *Attorney, Agent, or Firm* — Hamilton DeSanctis & Cha

(57) ABSTRACT

Various embodiments of the present invention provide systems and methods for data processing. For example, a data processing system is disclosed that includes: a data detector circuit, a filter circuit, and a mean squared calculation circuit. The data detector circuit is operable to apply a data detection algorithm to a data set to yield a detected output. The filter circuit is operable to filter the detected output to yield a filtered output. The mean squared calculation circuit is operable to calculate a mean squared error value based at least in part on the data set and the filtered output. A quality indicator is generated at least in part on the mean squared error value.

20 Claims, 4 Drawing Sheets

SYSTEMS AND METHODS FOR CHANNEL QUALITY DETERMINATION

BACKGROUND OF THE INVENTION

The present inventions are related to systems and methods for system characterization, and more particularly to systems and methods for tuning a data processing system.

Various storage systems include data processing circuitry implemented with one or more modifiable variables that may be tuned to improve processing performance. In some cases, known data patterns are provided to the data processing circuitry, and an error rate of the data processing circuitry is monitored while one or more of the modifiable variables are changed. This process is continued until acceptable values for the modifiable variables are identified. Such an approach utilizes storage area for the known pattern thus diminishing the usable storage area, and obtaining a meaningful error rate can take considerable time which increases the costs of manufacturing the storage systems.

Hence, for at least the aforementioned reasons, there exists a need in the art for advanced systems and methods for data processing.

BRIEF SUMMARY OF THE INVENTION

The present inventions are related to systems and methods for system characterization, and more particularly to systems and methods for tuning a data processing system.

Various embodiments of the present invention provide data processing systems. Such data processing systems includes: a data detector circuit, a filter circuit, and a mean squared calculation circuit. The data detector circuit is operable to apply a data detection algorithm to a data set to yield a detected output. The filter circuit is operable to filter the detected output to yield a filtered output. The mean squared calculation circuit is operable to calculate a mean squared error value based at least in part on the data set and the filtered output. A quality indicator is generated at least in part on the mean squared error value. In some instances of the aforementioned embodiments, the data processing system is implemented as part of a storage device or a receiving device. In various cases, the data processing system is implemented as part of an integrated circuit.

In one or more embodiments of the present invention, the mean squared calculation circuit is operable to calculate the mean squared error value consistent with the following equation:

$$\sum_{i=0}^{n} (NoiseFilter[\text{the data set}_i - \text{the target output}_i])^2,$$

where i indicates corresponding instances of the data set and the filtered input, and n indicates the number of instances incorporated into the mean squared error value. In various instances of the aforementioned embodiments, the data detection algorithm may be, but is not limited to, a maximum a posteriori data detection algorithm or a Viterbi detection algorithm. In some embodiments of the present invention, the filter circuit is a target filter circuit governed at least in part by a target input.

In various instances of the aforementioned embodiments, the data processing system further includes a data decoder circuit operable to apply a data decode algorithm to a derivative of the detected output to yield a decoded output. In some cases, the data decode algorithm is a low density parity check algorithm. In one or more instances of the aforementioned embodiments, the data processing systems further include a parameter search circuit. The parameter search circuit is operable to: select a first value for a parameter governing operation on at least a portion of the data processing system and to store an initial value as a prior quality metric; receive the quality indicator corresponding to the first value; compare the quality indicator with the prior quality metric; where the quality indicator is better than the prior quality metric, store the first value as a selected parameter value and store the quality indicator corresponding to the first value as the prior quality metric; select a second value for the parameter; receive the quality indicator corresponding to the second value; compare the quality indicator with the prior quality metric; and where the quality indicator is better than the prior quality metric, store the second value as a selected parameter value and store the quality indicator corresponding to the second value as the prior quality metric. In some cases, selecting the first value for the parameter includes selecting one of a number of values to be searched; and selecting the second value for the parameter includes selecting another of the number of values to be searched.

Other embodiments of the present invention provide methods for data processing. The methods include: performing a data detection algorithm using a data detector circuit on a data set to yield a detected output; filtering the detected output to yield a filtered output; calculating a mean squared error value based at least in part on the data set and the filtered output; and generating a quality indicator based at least in part on the mean squared error value. In some embodiments of the present invention, the methods further include performing a parameter value search based at least in part on the quality indicator to identify a value of a parameter governing operation of a data processing circuit. In some cases, performing the parameter value search includes: selecting a first value for the parameter and storing an initial value as a prior quality metric; receiving the quality indicator corresponding to the first value; comparing the quality indicator with the prior quality metric; where the quality indicator is better than the prior quality metric, storing the first value as a selected parameter value and storing the quality indicator corresponding to the first value as the prior quality metric; selecting a second value for the parameter; receiving the quality indicator corresponding to the second value; comparing the quality indicator with the prior quality metric; and where the quality indicator is better than the prior quality metric, storing the second value as a selected parameter value and storing the quality indicator corresponding to the second value as the prior quality metric.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference

DETAILED DESCRIPTION OF THE INVENTION

The present inventions are related to systems and methods for system characterization, and more particularly to systems and methods for tuning a data processing system.

Various embodiments of the present invention provide systems and methods for providing an indication of a channel quality and/or data processing circuit operation. In some cases, the systems and methods utilize the provided indication of channel quality to tune one or more parameters governing operation of the data processing circuit. In some cases, the indication of channel quality is a mean squared error value relying on a noise filtered difference value.

Figure 1:
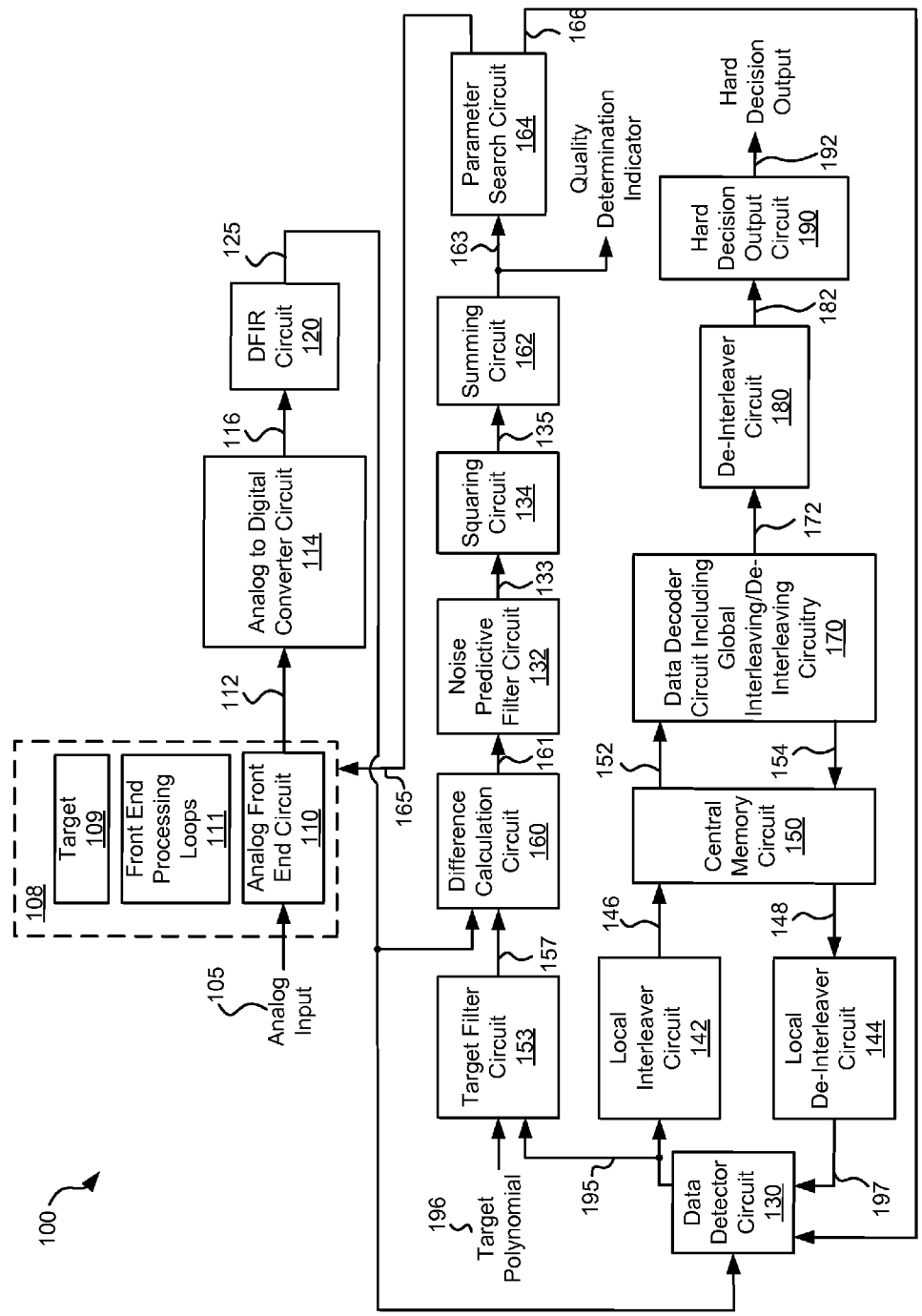
FIG. 1 shows a data processing circuit including a noise filtered mean squared error value circuitry used to generate a channel quality indication in accordance with one or more embodiments of the present invention.

Turning to FIG. 1, a data processing circuit 100 is depicted that includes a noise filtered mean squared error value circuitry used to generate a channel quality indication in accordance with one or more embodiments of the present invention. Data processing circuit 100 includes an analog processing circuit 108 that includes an analog front end circuit 110, front end processing loops 111 operable to provide timing and control to analog front end circuit 110, and a target circuit 109 operable to provide target based filtering feedback to analog front end circuit 110. Analog front end circuit 110 may include, but is not limited to, an analog filter and an amplifier circuit as are known in the art. Based upon the disclosure provided herein, one of ordinary skill in the art will recognize a variety of circuitry that may be included as part of analog front end circuit 110. In some cases, the gain of a variable gain amplifier included as part of analog front circuit 110 may be modifiable, and the cutoff frequency and boost of an analog filter included in analog front end circuit 110 may be modifiable. Front end processing loops 111 may be any processing loops operable to provide timing for analog front end circuit 110 known in the art. In some cases, such front end processing loops 111 include a DC loop offset that may be modifiable. Target circuit 109 may be any target based filter circuit known in the art. In various cases, a target used by target circuit 109 may be modifiable. Based upon the disclosure provided herein, one of ordinary skill in the art will recognize a variety of target based filter circuits and front end processing loops that may be used in relation to different embodiments of the present invention.

Analog front end circuit 110 receives an analog signal 105. Analog front end circuit 110 processes analog signal 105 and provides a processed analog signal 112 to an analog to digital converter circuit 114. In some cases, analog signal 105 is derived from a read/write head assembly (not shown) that is disposed in relation to a storage medium (not shown). In other cases, analog signal 105 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which analog input 105 may be derived.

Analog to digital converter circuit 114 converts processed analog signal 112 into a corresponding series of digital samples 116. Analog to digital converter circuit 114 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 116 are provided to an equalizer circuit 120. Equalizer circuit 120 applies an equalization algorithm to digital samples 116 to yield an equalized output 125. In some embodiments of the present invention, equalizer circuit 120 is a digital finite impulse response filter circuit as are known in the art. Equalized output 125 is provided to a data detector circuit 130. In some cases, equalizer circuit 120 includes sufficient memory to maintain one or more codewords until a data detector circuit 130 is available for processing.

Data detector circuit 130 is operable to apply a data detection algorithm to a received codeword or data set, and in some cases data detector circuit 130 can process two or more codewords in parallel. In some embodiments of the present invention, data detector circuit 130 is a Viterbi algorithm data detector circuit as are known in the art. In other embodiments of the present invention, data detector circuit 130 is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Data detector circuit 130 is started based upon availability of a data set from equalizer circuit 120 or from a central memory circuit 150.

Upon completion, data detector circuit 130 provides detector output 195. Detector output 195 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detected output 195 is provided to a local interleaver circuit 142 and reliability monitor circuit 160. Local interleaver circuit 142 is operable to shuffle sub-portions (i.e., local chunks) of the data set included as detected output and provides an interleaved codeword 146 that is stored to central memory circuit 150. Interleaver circuit 142 may be any circuit known in the art that is capable of shuffling data sets to yield a re-arranged data set. Interleaved codeword 146 is stored to central memory circuit 150.

Once a data decoder circuit 170 is available, a previously stored interleaved codeword 146 is accessed from central memory circuit 150 as a decoder input 152, globally interleaved as is known in the art, and a data decode algorithm is applied. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. As the data decode algorithm completes on a given data set, it is determined whether the decode algorithm converged (i.e., the resulting data set matches the originally written data set as indicated by the lack of parity errors). Where it is determined that the decode algorithm converged, the resulting decoded data set is provided as a hard decision output 172 to a de-interleaver circuit 180. De-interleaver circuit 180 rearranges the data to reverse both the global and local interleaving applied to the data to yield a de-interleaved output 182. De-interleaved output 182 is provided to a hard decision output circuit 190. Hard decision output circuit 190 is operable to re-order data sets that may complete out of order back into their original order. The originally ordered data sets are then provided as a hard decision output 192.

Alternatively, where it is determined that the data decode algorithm failed to converge (e.g., there are remaining parity errors), the completed data set is globally de-interleaved as is known in the art and written back to central memory circuit 150 as a decoder output 154. Once data detector circuit 130 is available, a previously stored decoder output 148 is accessed from central memory circuit 150 and locally de-interleaved by a de-interleaver circuit 144. De-interleaver circuit 144 re-arranges decoder output 148 to reverse the shuffling originally performed by interleaver circuit 142. A resulting de-interleaved output 197 is provided to data detector circuit 130.

A target filter circuit 153 convolves the detector output 195 with a target polynomial 196. Target polynomial 196 may be received from an external source, and may be any target polynomial known in the art that is capable of governing operation of a target filter. The result of the convolution is provided as a target output 157. Target output 157 is provided to a difference calculation circuit 160 that calculates a difference value 161 in accordance with the following equation:

Difference Value 161 = equalized output $125_i$ − target output $157_i$, where i indicates a corresponding instance of the inputs. Difference value 161 is provided to a noise predictive filter circuit 132 that yields a noise filtered output 132 (i.e., NoiseFilter[equalized output $125_i$ − target output $157_i$]). Noise predictive filter circuit 132 may be any circuit known in the art that is capable of noise predictive filtering an input to yield a noise filtered output. Noise filtered output 133 is provided to a squaring circuit 134 that provides a squared output 135 in accordance with the following equation:

Squared Output 135 = (NoiseFilter[equalized output $125_i$ − target output $157_i$])$^2$.

Squared output 135 is provided to a summing circuit 162 that sums a number (n) of instances of squared output 135 to yield a quality determination indicator 163. Quality determination indicator 163 may be calculated in accordance with the following equation:

Quality Determination Indicator 163 =

$$\sum_{i=0}^{n} (NoiseFilter[\text{equalized output } 125_i - \text{target output}_i\ 157])^2.$$

Quality determination indicator 163 is provided both as an output from data processing circuit 100 and as an input to parameter search circuit 164. Parameter search circuit 164 adaptively selects one or more parameter used to govern the operation of data processing circuit 100 based upon quality determination indicator 163. For example, the parameters may be communicated to: analog processing circuit 108 via an input/output 165, and/or data detector circuit 130 via an input output 166. The parameters may be, but are not limited to, a gain of a variable gain amplifier included in analog front end circuit 110, a cutoff frequency and/or boost of an analog filter included in analog front end circuit 110, a DC loop offset of front end processing loops 111, a target used by target circuit 109, and/or a detector parameter used by data detector circuit 130. Based upon the disclosure provided herein, one of ordinary skill in the art will recognize a variety of parameters that may be adjusted by parameter search circuit 164 in accordance with different embodiments of the present invention.

Figure 2:
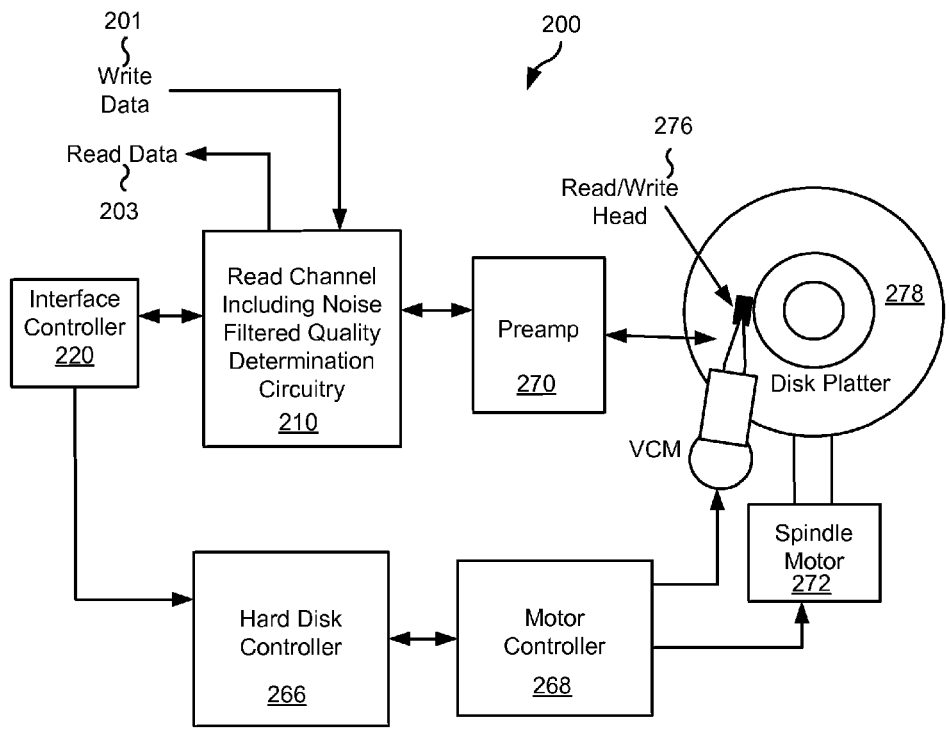
FIG. 2 shows a storage device including noise filtered quality determination circuitry in accordance with one or more embodiments of the present invention.

Turning to FIG. 2, a storage device 200 including noise filtered quality determination circuitry is shown in accordance with one or more embodiments of the present invention. Storage system 200 may be, for example, a hard disk drive. Storage system 200 also includes a preamplifier 270, an interface controller 220, a hard disk controller 266, a motor controller 268, a spindle motor 272, a disk platter 278, and a read/write head assembly 276. Interface controller 220 controls addressing and timing of data to/from disk platter 278. The data on disk platter 278 consists of groups of magnetic signals that may be detected by read/write head assembly 276 when the assembly is properly positioned over disk platter 278. In one embodiment, disk platter 278 includes magnetic signals recorded in accordance with either a longitudinal or a perpendicular recording scheme.

In a typical read operation, read/write head assembly 276 is accurately positioned by motor controller 268 over a desired data track on disk platter 278. Motor controller 268 both positions read/write head assembly 276 in relation to disk platter 278 and drives spindle motor 272 by moving read/write head assembly to the proper data track on disk platter 278 under the direction of hard disk controller 266. Spindle motor 272 spins disk platter 278 at a determined spin rate (RPMs). Once read/write head assembly 278 is positioned adjacent the proper data track, magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel circuit 210 via preamplifier 270. Preamplifier 270 is operable to amplify the minute analog signals accessed from disk platter 278. In turn, read channel circuit 210 decodes and digitizes the received analog signal to recreate the information originally written to disk platter 278. This data is provided as read data 203 to a receiving circuit. A write operation is substantially the opposite of the preceding read operation with write data 201 being provided to read channel circuit 210. This data is then encoded and written to disk platter 278.

During operation, read channel circuit 210 calculates a quality determination indicator that may be provided to a host via interface controller 220, and/or may be used internal to read channel circuit 210 to modify one or more parameters governing the operation of read channel circuit 210. Read channel circuit 210 may be implemented to include the data processing system of FIG. 1 discussed above, and/or may operate consistent with the operation discussed in relation to FIGS. 4-5 discussed below.

It should be noted that storage system 200 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

Figure 3:
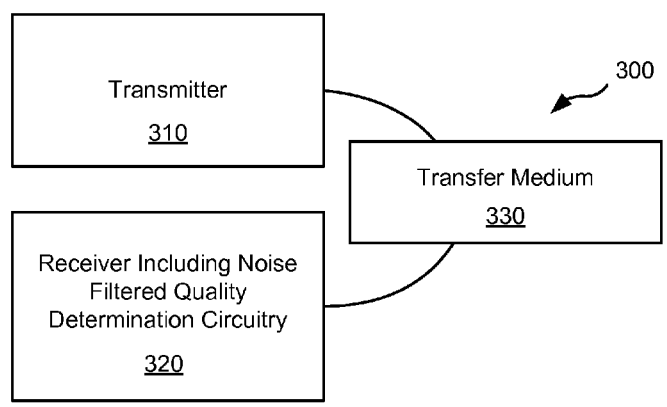
FIG. 3 shows a data transmission system including noise filtered quality determination circuitry in accordance with some embodiments of the present invention.

Turning to FIG. 3, a data transmission system 300 including noise filtered quality determination circuitry is shown in accordance with some embodiments of the present invention. Data transmission system 300 includes a transmitter 310 that is operable to transmit encoded information via a transfer medium 330 as is known in the art. The encoded data is received from transfer medium 330 by receiver 320. Receiver 320 incorporates the noise filtered quality determination circuitry. While processing received data, received data is converted from an analog signal to a series of corresponding digital samples, and the digital samples are equalized to yield an equalized output. The equalized output is then provided to a data processing circuit including both a data detector circuit and a data decoder circuit. Data is passed between the data decoder and data detector circuit via a central memory allowing for variation between the number of processing iterations that are applied to different data sets. It should be noted that transfer medium 330 may be any transfer medium known in the art including, but not limited to, a wireless medium, an optical medium, or a wired medium. Based upon the disclosure provided herein, one of ordinary skill in the art will recognize a variety of transfer mediums that may be used in relation to different embodiments of the present invention.

During operation, receiver 320 calculates a quality determination indicator that may be provided to a host (not shown), and/or may be used internal to receiver 320 to modify one or more parameters governing the operation of receiver 320. Receiver 320 may be implemented to include the data processing system of FIG. 1 discussed above, and/or may operate consistent with the operation discussed in relation to FIGS. 4-5 discussed below.

Figure 4:
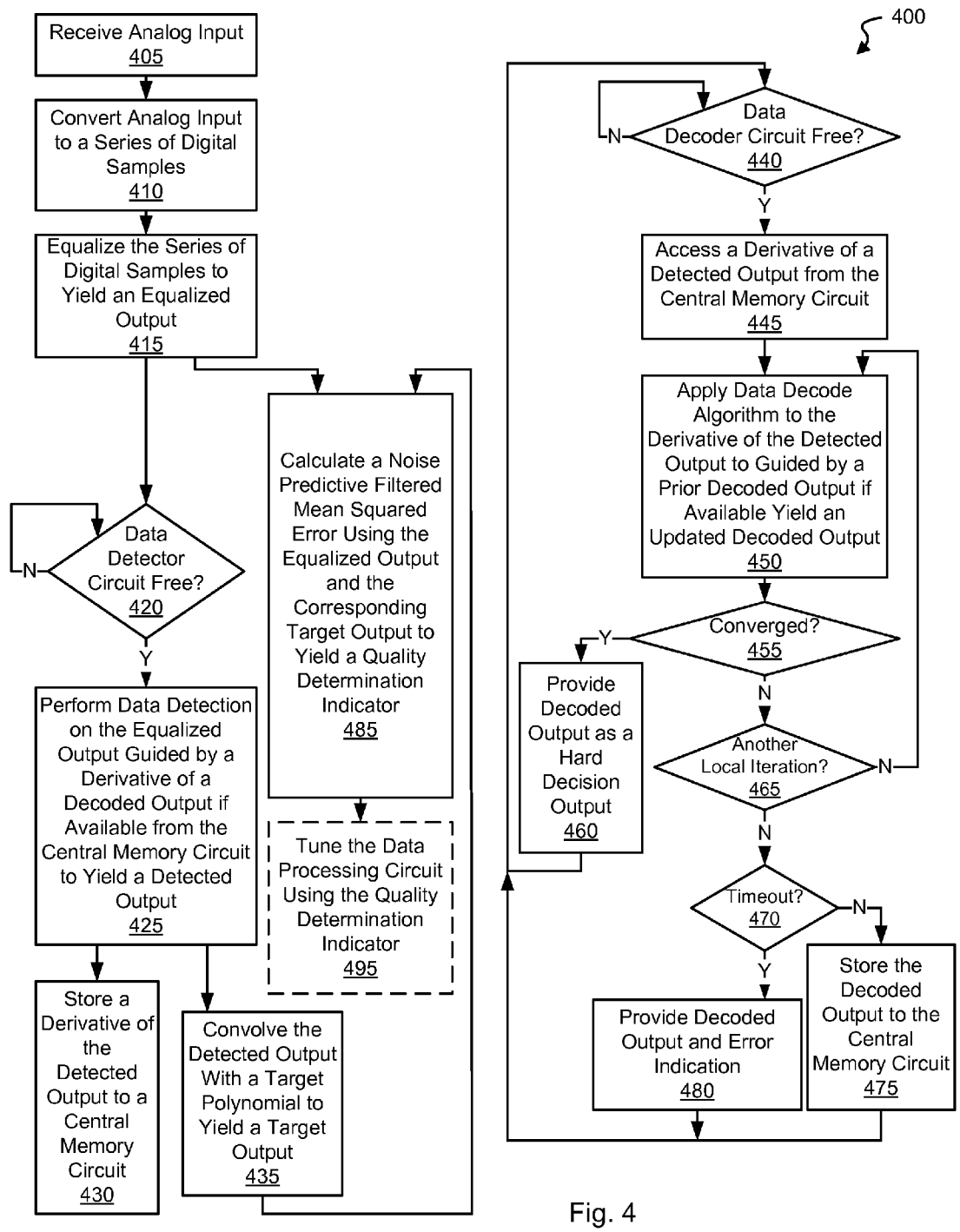
FIG. 4 is a flow diagram showing a method for noise filtered mean squared error value based quality determination in accordance with various embodiments of the present invention.

Turning to FIG. 4, a flow diagram 400 shows a method in accordance with various embodiments of the present invention for noise filtered mean squared error value based quality determination. Following flow diagram 400, an analog input is received (block 405). The analog input may be derived from, for example, a storage medium or a data transmission channel. Based upon the disclosure provided herein, one of ordinary skill in the art will recognize a variety of sources of the analog input. The analog input is converted to a series of digital samples (block 410). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 415). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention.

It is determined whether a data detector circuit is available (block 420). Where a data detector circuit is available (block 420), a data detection algorithm is applied to the equalized output guided by a data set derived from a decoded output where available (e.g., the second and later iterations through the data detector circuit and the data decoder circuit) from a central memory circuit to yield a detected output (block 425). In some embodiments of the present invention, data detection algorithm is a Viterbi algorithm as are known in the art. In other embodiments of the present invention, the data detection algorithm is a maximum a posteriori data detector circuit as are known in the art. The data set derived from the decoded output may be a de-interleaved version of the decoded data set. A signal derived from the detected output (e.g., a locally interleaved version of the detected output) is stored to the central memory to await processing by a data decoder circuit (block 430).

In addition, the detected output is convolved with a target polynomial to yield a target output (block 435). A mean squared error is calculated using the equalized output and the corresponding target output to yield a quality determination indicator (block 485). This calculation includes calculating a difference between corresponding instances of the equalized output and the target output in accordance with the following equation:

$$\text{Difference Value} = \text{equalized output}_i - \text{target output}_i,$$

where i indicates a corresponding instance of the inputs. The difference value is then filtered using a noise predictive filter circuit to yield a noise filtered output (i.e., NoiseFilter[equalized output$_i$−target output$_i$]). The noise predictive filter circuit may be any circuit known in the art that is capable of noise predictive filtering an input to yield a noise filtered output. The noise filtered output is squared to yield a squared output in accordance with the following equation:

$$\text{Squared Output} = (\text{NoiseFilter}[\text{equalized output}_i - \text{target output}_i])^2.$$

A number (n) of instances of the squared output are summed to yield the quality determination indicator. The quality determination indicator may be calculated in accordance with the following equation:

$$\text{Quality Determination Indicator} = \sum_{i=0}^{n} (\textit{NoiseFilter}[\text{equalized output}_i - \text{target output}_i])^2.$$

In some cases, the quality determination indicator is used to tune one or more parameters governing operation of the data processing circuit (block 495). An example of the processes of block 495 is set forth in FIG. 5 below.

In parallel to the previously discussed data detection processing, it is determined whether a data decoder circuit is available (block 440). Where the data decoder circuit is available (block 440), a previously stored derivative of a detected output is accessed from the central memory (block 445). A data decode algorithm is applied to the derivative of the detected output to yield a decoded output (block 450). In some embodiments of the present invention, the data decode algorithm is a low density parity check decode algorithm as are known in the art.

It is determined whether the decoded output converged (i.e., the original data set is recovered) (block 455). In some cases, such convergence is found where all of the checksum equations utilized as part of the low complexity decode algorithm are correct (i.e., there are no unsatisfied checks). Where the decode algorithm converged (block 455), the decoded output is provided as a hard decision output (block 460). Otherwise, where the data decode algorithm failed to converge (block 455), it is determined whether another local iteration is desired (block 465). In some cases, up to four local iterations are allowed. Based upon the disclosure provided herein, one of ordinary skill in the art will recognize other allowable numbers of local iterations. Where another local iteration is desired (block 465), the processes of blocks 450-465 are repeated for the same data set using the previous decoded output as a guide.

Otherwise, where another local iteration is not desired (block 465), it is determined whether a timeout condition has been met (block 470). A timeout condition may include, but is not limited to, a maximum number of global iterations (i.e., application of the data detection algorithm followed by application of the data decode algorithm), or insufficient area in the central storage to receive the non-converging decoded output. Based upon the disclosure provided herein, one of ordinary skill in the art will recognize a variety of timeout conditions. Where the timeout condition has not been met (block 470), the decoded output is stored to the central memory circuit (block 475). In contrast, where the timeout condition has been met (block 470), the decoded output is provided as an output along with an error indication (block 480).

Figure 5:
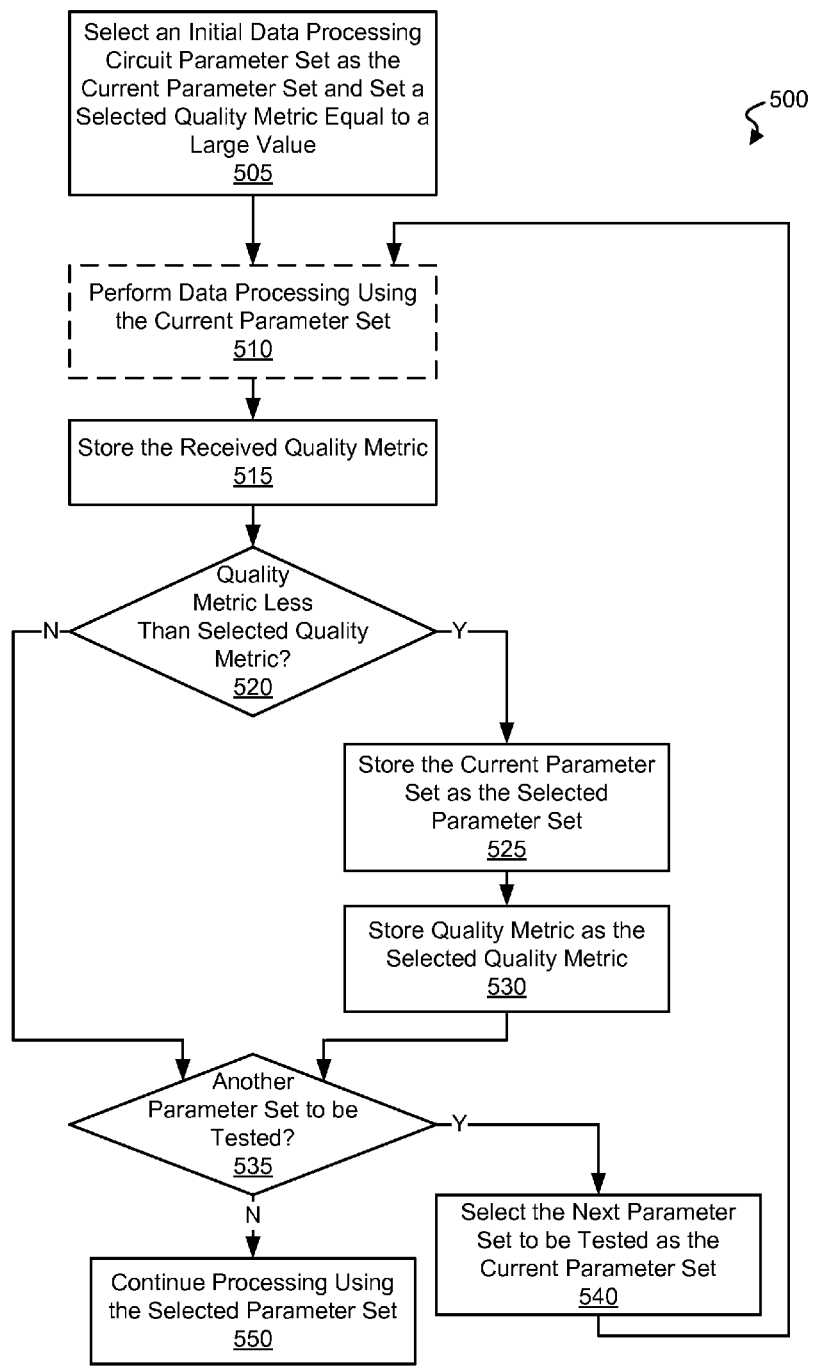
FIG. 5 is a flow diagram showing an example method for tuning a data processing circuit using the quality determination indicator of FIG. 4.

Turning to FIG. 5, a flow diagram 500 shows an example method for tuning a data processing circuit using the quality determination indicator of flow diagram 400 of FIG. 4. Following flow diagram 500, an initial data processing circuit parameter set is selected as the current parameter set, and a prior quality metric is set equal to a large value (block 505). The parameters may be, but are not limited to, a gain of a variable gain amplifier, a cutoff frequency and/or boost of an analog filter, a DC loop offset of front end processing loop, a target polynomial, and/or a detector parameter used by the data detection algorithm. Data processing is then applied to a received data set using the current parameter set (block 510). Such data processing may be performed consistent with that discussed in relation to FIG. 4. The resulting quality metric (i.e., the quality determination indicator calculated in block 490).

It is determined whether the resulting quality metric is less than the prior quality metric (block 520). Where the quality metric is less than the prior quality metric (block 520), the current parameter set is stored as the selected parameter set (block 525). In addition, the quality metric is stored as the selected quality metric (block 530). Where either the quality metric is not less than the prior quality metric (block 520) or after the quality metric has been stored as the selected quality metric (block 530), it is determined whether there remains another parameter set to be tested (block 535). Where another parameter set remains to be tested (block 535), the next parameter set to be tested is selected as the current parameter set (block 540), and the processes of blocks 505-550 for the next parameter set. Otherwise, where no additional parameter sets remain to be tested (block 535), processing (i.e., the processing of flow diagram 400 of FIG. 4) continues using the selected parameter set (block 550)

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
   a data detector circuit operable to apply a data detection algorithm to a data set to yield a detected output;
   a filter circuit operable to filter the detected output to yield a filtered output; and
   a mean squared calculation circuit operable to calculate a mean squared error value based at least in part on the data set and the filtered output, wherein a quality indicator is generated at least in part on the mean squared error value, and wherein the mean squared calculation circuit includes a noise predictive filter circuit.

2. The data processing system of claim 1, wherein the mean squared calculation circuit is operable to calculate the mean squared error value consistent with the following equation:

$$\sum_{i=0}^{n} (NoiseFilter[\text{the data set}_i - \text{the filtered output}_i])^2,$$

wherein i indicates corresponding instances of the data set and the filtered input, n indicates the number of instances incorporated into the mean squared error value, and the NoiseFilter[ ] indicate processing by the noise predictive filter circuit.

3. The data processing system of claim 1, wherein the data detection algorithm is selected from a group consisting of: a maximum a posteriori data detection algorithm and a Viterbi detection algorithm.

4. The data processing system of claim 1, the data processing system further comprising:
a data decoder circuit operable to apply a data decode algorithm to a derivative of the detected output to yield a decoded output.

5. The data processing system of claim 4, wherein the data decode algorithm is a low density parity check algorithm.

6. The data processing system of claim 1, wherein the data processing system further comprises:
a parameter search circuit operable to:
select a first value for a parameter governing operation on at least a portion of the data processing system and to store an initial value as a prior quality metric;
receive the quality indicator corresponding to the first value;
compare the quality indicator with the prior quality metric;
where the quality indicator is better than the prior quality metric, store the first value as a selected parameter value and store the quality indicator corresponding to the first value as the prior quality metric;
select a second value for the parameter;
receive the quality indicator corresponding to the second value;
compare the quality indicator with the prior quality metric; and
where the quality indicator is better than the prior quality metric, store the second value as a selected parameter value and store the quality indicator corresponding to the second value as the prior quality metric.

7. The data processing system of claim 6, wherein:
selecting the first value for the parameter includes selecting one of a number of values to be searched; and
selecting the second value for the parameter includes selecting another of the number of values to be searched.

8. The data processing circuit of claim 1, wherein the filter circuit is a target filter circuit governed at least in part by a target input.

9. The data processing system of claim 1, wherein the data processing system is implemented as part of a device selected from a group consisting of: a storage device and a receiving device.

10. The data processing system of claim 1, wherein the data processing system is implemented as part of an integrated circuit.

11. A method for data processing, the method comprising:
performing a data detection algorithm using a data detector circuit on a data set to yield a detected output;
filtering the detected output to yield a filtered output;
calculating a mean squared error value based at least in part on the data set and the filtered output; and
generating a quality indicator based at least in part on the mean squared error value, wherein generating the quality indicator includes applying a noise predictive filtering to an interim value.

12. The method of claim 11, wherein the method further comprises:
performing a parameter value search based at least in part on the quality indicator to identify a value of a parameter governing operation of a data processing circuit.

13. The method of claim 12, wherein performing the parameter value search comprises:
selecting a first value for the parameter and storing an initial value as a prior quality metric;
receiving the quality indicator corresponding to the first value;
comparing the quality indicator with the prior quality metric;
where the quality indicator is better than the prior quality metric, storing the first value as a selected parameter value and storing the quality indicator corresponding to the first value as the prior quality metric;
selecting a second value for the parameter;
receiving the quality indicator corresponding to the second value;
comparing the quality indicator with the prior quality metric; and
where the quality indicator is better than the prior quality metric, storing the second value as a selected parameter value and storing the quality indicator corresponding to the second value as the prior quality metric.

14. The method of claim 13, wherein:
selecting the first value for the parameter includes selecting one of a number of values to be searched; and
selecting the second value for the parameter includes selecting another of the number of values to be searched.

15. The method for data processing of claim 11, wherein the mean squared error value is calculated consistent with the following equation:

$$\sum_{i=0}^{n} (NoiseFilter[\text{the data set}_i - \text{the filtered output}_i])^2,$$

wherein i indicates corresponding instances of the data set and the filtered input, n indicates the number of instances incorporated into the mean squared error value, and the NoiseFilter[ ] indicates applying the noise predictive filtering to the interim value.

16. The method of claim 11, wherein the data detection algorithm is selected from a group consisting of: a maximum a posteriori data detection algorithm and a Viterbi detection algorithm.

17. A storage device, the storage device comprising:
a storage medium;
a head assembly disposed in relation to the storage medium and operable to provide a sensed signal corresponding to information on the storage medium;
a read channel circuit including:
an analog to digital converter circuit operable to sample an analog signal derived from the sensed signal to yield a series of digital samples;
an equalizer circuit operable to equalize the digital samples to yield a data set;
a data detector circuit operable to apply a data detection algorithm to a data set to yield a detected output;
a target filter circuit operable to filter the detected output to yield a filtered output based at least in part on a target input; and
a mean squared calculation circuit operable to calculate a mean squared error value based at least in part on the data set and the filtered output, wherein a quality indicator is generated at least in part on the mean squared error value, and wherein the mean squared calculation circuit includes a noise predictive filter circuit.

18. The storage device of claim 17, wherein the storage device further comprises:
 a parameter search circuit operable to:
  select a first value for a parameter governing operation on at least a portion of the data processing system and to store an initial value as a prior quality metric;
  receive the quality indicator corresponding to the first value;
  compare the quality indicator with the prior quality metric;
  where the quality indicator is better than the prior quality metric, store the first value as a selected parameter value and store the quality indicator corresponding to the first value as the prior quality metric;
  select a second value for the parameter;
  receive the quality indicator corresponding to the second value;
  compare the quality indicator with the prior quality metric; and
  where the quality indicator is better than the prior quality metric, store the second value as a selected parameter value and store the quality indicator corresponding to the second value as the prior quality metric.

19. The storage device of claim 18, wherein:
 selecting the first value for the parameter includes selecting one of a number of values to be searched; and
 selecting the second value for the parameter includes selecting another of the number of values to be searched.

20. The storage device of claim 17, wherein the filter circuit is a target filter circuit governed at least in part by a target input.

* * * * *